US010735231B2

(12) United States Patent
Fompeyrine et al.

(10) Patent No.: US 10,735,231 B2
(45) Date of Patent: Aug. 4, 2020

(54) DEMODULATING MODULATED SIGNALS WITH ARTIFICIAL NEURAL NETWORKS

(71) Applicant: International Business Machines Corporation, Armonk, NY (US)

(72) Inventors: Jean Fompeyrine, Waedenswil (CH); Stefan Abel, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/225,791

(22) Filed: Dec. 19, 2018

(65) Prior Publication Data

US 2020/0204412 A1    Jun. 25, 2020

(51) Int. Cl.
| | | |
|---|---|---|
| *H04B 10/04* | (2006.01) | |
| *H04L 27/22* | (2006.01) | |
| *H04L 27/20* | (2006.01) | |
| *G06N 3/067* | (2006.01) | |

(52) U.S. Cl.
CPC ......... *H04L 27/223* (2013.01); *G06N 3/0675* (2013.01); *H04L 27/2017* (2013.01); *H04L 27/2096* (2013.01)

(58) Field of Classification Search
CPC .............. H04L 27/223; H04L 27/2017; H04L 27/2096; H04L 25/03343; H04L 1/0055; G06N 3/0675; H04B 10/116; H04B 10/1141; H04B 10/1149; H04B 10/00; H04B 10/1121; H04B 10/5561;
(Continued)

(56) References Cited

U.S. PATENT DOCUMENTS

| | | | | |
|---|---|---|---|---|
| 8,165,472 B2* | 4/2012 | Takene | ................. | H04B 10/116 398/172 |
| 8,515,061 B2 | 8/2013 | Patwari et al. | | |
| 9,473,250 B2* | 10/2016 | Koike-Akino | ........ | H04L 1/0054 |

(Continued)

FOREIGN PATENT DOCUMENTS

| | | |
|---|---|---|
| CA | 2748373 A1 | 8/2010 |
| EP | 2506458 A1 | 10/2012 |

(Continued)

OTHER PUBLICATIONS

Yi, Y., et al., "FPGA based spike-time dependent encoder and reservoir design in neuromorphic computing processors", Microprocessors and Microsystems, Received Sep. 8, 2015, Revised Feb. 8, 2016, Accepted Mar. 2, 2016, Available online Mar. 8, 2016, pp. 175-183, vol. 46.

(Continued)

*Primary Examiner* — Hibret A Woldekidan
(74) *Attorney, Agent, or Firm* — Scully, Scott, Murphy & Presser, P.C.; Daniel P. Morris (57) ABSTRACT

Demodulating a modulated signal. A method may include receiving a modulated signal, wherein the modulated signal is a signal modulated according to a modulation function varying faster than the signal. The modulation function is a function of the signal. The modulated signal received is demodulated with an artificial neural network system, or ANN system, which is trained to identify bit values from signal patterns as caused by the modulation function, by identifying bit values from patterns of the modulated signal received. Related modulation and demodulation systems are disclosed.

22 Claims, 5 Drawing Sheets

(58) Field of Classification Search
CPC ............ H04B 10/5055; H04B 10/6165; H04B 1/709; H04B 1/71637; H04J 14/005
USPC ........ 398/183, 140, 188, 186, 189, 202, 174
See application file for complete search history.

(56) References Cited

U.S. PATENT DOCUMENTS

| | | | |
|---|---|---|---|
| 9,477,136 | B2 | 10/2016 | Bienstman et al. |
| 9,489,623 | B1* | 11/2016 | Sinyavskiy ............ G06N 3/084 |
| 9,916,538 | B2* | 3/2018 | Zadeh .................... G06N 7/005 |
| 2004/0047639 | A1* | 3/2004 | McAlexander ........ H04B 10/60 398/202 |
| 2010/0157771 | A1 | 6/2010 | Ross et al. |
| 2014/0143823 | A1 | 5/2014 | Manchester et al. |
| 2015/0249554 | A1 | 9/2015 | Vaman et al. |
| 2017/0353266 | A1* | 12/2017 | Cornett ................. H04L 1/0002 |
| 2018/0189645 | A1* | 7/2018 | Chen .................... G06N 3/0445 |
| 2019/0049583 | A1* | 2/2019 | Xu ........................ H04L 1/0042 |
| 2019/0258926 | A1* | 8/2019 | Abel ....................... G06N 3/08 |
| 2019/0294021 | A1* | 9/2019 | Abel ..................... G11C 13/041 |
| 2019/0356385 | A1* | 11/2019 | Jang ........................ H04L 27/18 |

FOREIGN PATENT DOCUMENTS

| | | |
|---|---|---|
| EP | 3144701 A1 | 3/2017 |
| WO | 2010/088030 A3 | 8/2010 |
| WO | 2014/206583 A1 | 12/2014 |
| WO | WO-2017122924 A1 * | 7/2017 ............ H04L 27/18 |

OTHER PUBLICATIONS

Vinckier, Q., et al., "High performance photonic reservoir computer based on a coherently driven passive cavity", https://arxiv.org/ftp/arxiv/papers/1501/1501.03024.pdf, Accessed on Dec. 19, 2018, 8 pages.

IBM, "CryptoCards", https://www-03.ibm.com/security/cryptocards/index.shtml, Accessed on Dec. 19, 2018, 2 pages.

Othman, K.M.Z., et al., "Implementation of Neural—Cryptographic System Using FPGA", Journal of Engineering Science and Technology, Aug. 2011, pp. 411-428, vol. 6, No. 4.

Alharbi, A., et al., "Physically Unclonable Cryptographic Primitives by Chemical Vapor Deposition of Layered MoS2", ACS Nano 2017, Received Oct. 25, 2017, Accepted and Published Nov. 16, 2017, pp. 12772-12779, vol. 11.

Shrivastava, A., et al., "Design of a Reliable RRAM-based PUF for Compact Hardware Security Primitives", 2016 IEEE International Symposium on Circuits and Systems (ISCAS), May 2016, pp. 2326-2329.

International Search Report dated Mar. 10, 2020, issued in PCT/162019/060294, 9 pages.

* cited by examiner

DEMODULATING MODULATED SIGNALS WITH ARTIFICIAL NEURAL NETWORKS

BACKGROUND

The present disclosure relates in general to techniques of demodulation using artificial neural networks, and in particular to techniques relying on photonic computing systems configured as optical reservoir networks.

Machine learning mostly relies on artificial neural networks (ANNs), which are computational models inspired by biological neural networks in human or animal brains. Such systems progressively and autonomously learn tasks by means of examples; they have successfully been applied to, e.g., speech recognition, text processing and computer vision.

An ANN comprises a set of connected units or nodes, which compare to biological neurons in animal brains and are therefore called artificial neurons. Signals are transmitted along connections (also called edges) between artificial neurons, similarly to synapses. That is, an artificial neuron that receives a signal processes it and then signals connected neurons. In implementations, the signals conveyed along such connections are analog real numbers and outputs of the artificial neurons are computed thanks to a non-linear function of the sum of its inputs. In photonic networks, signals can also be conveyed as complex numbers.

Connection weights (also called synaptic weights) are normally associated with the connections and nodes; such weights adjust as learning proceeds. Each neuron may have several inputs and a connection weight is attributed to each input (the weight of that specific connection). Such connection weights are learned by the training algorithm during a training phase and thereby updated. The learning process is iterative: data cases are presented to the network, typically one at a time, and the weights associated with the input values are adjusted at each time step.

Many types of neural networks are known, starting with feedforward neural networks, such as multilayer perceptrons, deep neural networks and convolutional neural networks. Besides, new types of neural networks emerge, such as spiking neural networks. A spiking neural network (SNN) substantially differs from usual neural networks, inasmuch as SNNs operate using spikes, which may for example be discrete binary events that can occur asynchronously at any point in time, rather than analog values computed at regular time-steps. That is, in addition to neuronal and synaptic state, SNNs further incorporate the concept of time. I.e., neurons fire only when a membrane potential reaches a specific value, rather than firing at each propagation cycle as in, e.g., multi-layer perceptron networks. Firing means, in the context of SNNs, that a neuron generates a signal that reaches other neurons, which, in turn, increase or decrease their potentials according to the signals they receive from other neurons.

Closely related, reservoir computing systems allow the analysis of dynamical input data by training the output for certain tasks, e.g. for classification or forecast purposes. Typically, inputs are fed into a fixed, random dynamical system (the reservoir) and dynamics of the reservoir map inputs onto higher dimensional system. A suitably trained readout mechanism is then used to read the state of the reservoir, in order to map this state onto the output, whereby only the readout stage need be trained, while the reservoir is fixed. Main types of reservoir computing include echo state networks and liquid-state machines (which can be regarded as a particular kind of SNN).

Neural networks are typically implemented in software. However, a neural network may also be implemented in hardware, e.g., as a resistive processing unit or an optical neuromorphic system. For example, optical computing systems (also called photonic computing systems) are known, which rely on photons (e.g., produced by light sources such as lasers or diodes) for computation. For instance, application-specific devices such as and optical correlators have been proposed, which rely on optical computing to detect and/or track objects, or to classify serial time-domain optical data.

SUMMARY

According to a first aspect, the present invention is embodied as a method of demodulating a modulated signal. In one aspect, the method comprises receiving a modulated signal, wherein the modulated signal is a signal modulated according to a modulation function varying faster than the signal (i.e., in the time domain). The modulation function is a function of the signal. That is, the signal can be regarded as a variable (i.e., the argument or input) of the modulation function. The modulated signal received is demodulated with an artificial neural network system, or ANN system, which is trained to identify bit values from signal patterns as caused by the modulation function, by identifying bit values from patterns of the modulated signal received.

The present approach makes it possible to decode the signal received (e.g., directly on the stream received) at a rate that is higher than the bit rate of the bit sequence captured by the signal. Because the speed rate used is unknown to an attacker, this makes it virtually impossible to reconstruct the bit-sequence without a properly trained system. Now, beyond the fact that the encoding rate and the initial bit rate are unknown to an attacker, the resolution of the encoded signal may fall under the temporal resolution of the physical detection device used by the attacker, making it impossible to detect for that device.

In embodiments, the method further comprises, prior to receiving the modulated signal: modulating the signal according to said modulation function to obtain said modulated signal; and transmitting the modulated signal obtained, for it to be received and subsequently demodulated by the ANN system.

In some embodiments, the signal to be modulated is a digital signal; this signal is modulated over each time period corresponding to each of the discrete values captured by the digital signal, respectively, to obtain the modulated signal. The modulated signal can accordingly show variations (or oscillations) within the time interval corresponding to each discrete value of the initial signal, such that the resulting modulation pattern varies faster than the underlying bit sequence (the raw bit rate) and, this, for each time period corresponding to each discrete value of the initial digital signal.

In some embodiments, the modulation comprises, for each of said discrete values, modulating said digital signal according to said modulation function based on two or more discrete values of the digital signal, the discrete values including said each of the discrete values, as well as one or more previous discrete values of the digital signal.

In some embodiments, modulating the digital signal comprises streaming the digital signal to a modulator, for it to modulate the signal streamed on the fly, and transmitting comprises streaming the modulated signal to the ANN system for it to demodulate the streamed signal it receives on the fly. In variants, the demodulation is done in a streaming mode, while the modulation is done in a buffered way.

In embodiments, the method further comprises converting the modulated signal received into a discrete signal, for the ANN system to demodulate the converted signal by identifying bit values from patterns of values in the converted signal.

In some embodiments, the modulated signal is optically transmitted.

In some embodiments, the modulated signal received is an optical signal and the ANN system forms part of a photonic computing system, configured as a reservoir computing system. In that case, the method may further comprise coupling the modulated signal received into the ANN for the latter to demodulate the coupled signal by identifying bit values from patterns of the coupled signal.

In some embodiments, the signal is modulated with an electro-optic modulator, prior to being optically transmitted, for the transmitted signal to be received and subsequently demodulated by the photonic computing system.

In embodiments, modulating the signal comprises modulating an amplitude and/or a phase of an electromagnetic field carrying the signal.

In embodiments, modulating comprises modulating two or more input signals according to the modulation function, so as to obtain one or more modulated signals, each varying faster than the input signals, the modulation function being a function of the input signals, such that one or more modulated signals are subsequently received. I.e., the modulated signals are received (at the receiver) after modulation but such signals could for instance be modulated in parallel and, therefore, received in parallel when using multiple parallel transmission channels. In variants, however, the modulated signals may be transmitted one after the other. In all cases, the one or more modulated signals received are demodulated (e.g., upon or after reception thereof) with the ANN system, by identifying bit values from patterns of the one or more modulated signals received.

In some embodiments, the ANN system is implemented as a trainable hardware device and the method further comprises, prior to demodulating the modulated signal received, mapping temporal information captured by the modulated signal received onto one or more input nodes of an input layer of the ANN system. The ANN system further comprises an output layer of one or more output nodes. The input nodes of the input layer are connected to output nodes of the output layer via connections. At least some of these connections are associated to adjustable weight elements. In order to demodulate the modulated signal and thereby identify bit values, the ANN system reads signals from said output nodes.

The modulated signal may for instance be received as an optical input signal. In such cases, the ANN system may be implemented as part of a photonic computing system configured as a reservoir computing system, whereby mapping said temporal information comprises coupling said optical input signal onto an input node of the reservoir computing system. The input node is connected to one or more optical output nodes of the output layer via optical reservoir nodes of a reservoir layer of the reservoir computing system. Each of said optical output nodes is connected by one or more of the optical reservoir nodes via respective connections. Adjustable weight elements are respectively associated to said respective connections.

In embodiments, said signal encodes, prior to modulating it, a n-ary code, with n larger than or equal to two, and the modulated signal encodes, after modulating it, a m-ary code, with m strictly larger than n.

In some embodiments, the method further comprises training the ANN system, for it to identify bit values from signal patterns as caused by the modulation function.

In some embodiments, the method further comprises, after demodulating the modulated signal, adapting the modulation function based on feedback obtained from the demodulated signal, so as to adapt a property of a next modulated signal, and modulating a subsequent signal based on the adapted modulation function.

According to another aspect, the invention is embodied as a demodulator for demodulating a signal. The demodulator notably comprises an input unit configured to receive a modulated signal that is a signal modulated according to a modulation function varying faster than the signal, the modulation function being a function of the signal. The demodulator further comprises an ANN system connected to the input unit for the latter to couple the received signal into the ANN system, in operation. Consistently with the present methods, the ANN system is assumed to be trained to identify bit values from signal patterns as caused by the modulation function; the ANN system is configured to demodulate the modulated signal coupled into it by identifying bit values from patterns of the modulated signal it receives, in operation.

In embodiments, the ANN system is a photonic computing system configured as a reservoir computing system, the latter adapted to demodulate a modulated optical signal by identifying bit values from patterns of the modulated optical signal received by the input unit and coupled into the ANN system, in operation.

In some embodiments, the ANN system is implemented as a trainable hardware device in the demodulator. The ANN system comprises an input layer of one or more input nodes and an output layer of one or more output nodes, wherein the input nodes are connected to the output nodes via connections and at least some of these connections are associated to adjustable weight elements. The ANN system is otherwise configured to identify bit values by reading signals from said output nodes.

In some embodiments, the ANN system is implemented as a photonic computing system configured as a reservoir computing system, which comprises a single input node connected to one or more optical output nodes of the output layer via optical reservoir nodes of a reservoir layer thereof. Each optical output node is connected by one or more of the optical reservoir nodes via respective connections. Adjustable weight elements are respectively associated to said respective connections. Finally, the input unit is configured to receive said modulated signal as an optical input signal and couple the latter into the single input node.

According to a further and final aspect, the invention is embodied as a modulation system for modulating and demodulating a signal. This system first comprises a modulator configured to modulate a signal according to a modulation function to obtain a modulated signal. Again, the modulation function is a function of the signal, which varies faster than the initial signal. The system further includes a transmission unit operatively connected to the modulator to transmit modulated signal obtained by the latter, and a demodulator such as described above, wherein the input unit is configured to receive a modulated signal transmitted by the transmission unit, in operation.

In embodiments, the signal to be modulated is assumed to be a digital signal and the modulator is configured to modulate the digital signal over each time period corresponding to each of the discrete values captured by the digital signal, respectively, to obtain the modulated signal.

In some embodiments, the modulator is further configured to modulate, for each of said discrete values, said digital signal according to said modulation function, based on two or more discrete values of the digital signal, the discrete values including said each of said discrete values, as well as one or more previous discrete values of the digital signal.

In some embodiments, the modulator is adapted to modulate a streamed signal on the fly, and the ANN system is further configured to demodulate a modulated signal it receives on the fly.

In some embodiments, each of the modulator and the ANN system is a photonic computing system.

Apparatuses, computerized systems and methods embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 2A-2D and 3A-3D are plots of examples of signals (or portions thereof) as involved in embodiments. Such signals are represented in the time domain; the chosen examples are purposely simple.

Figure 5:
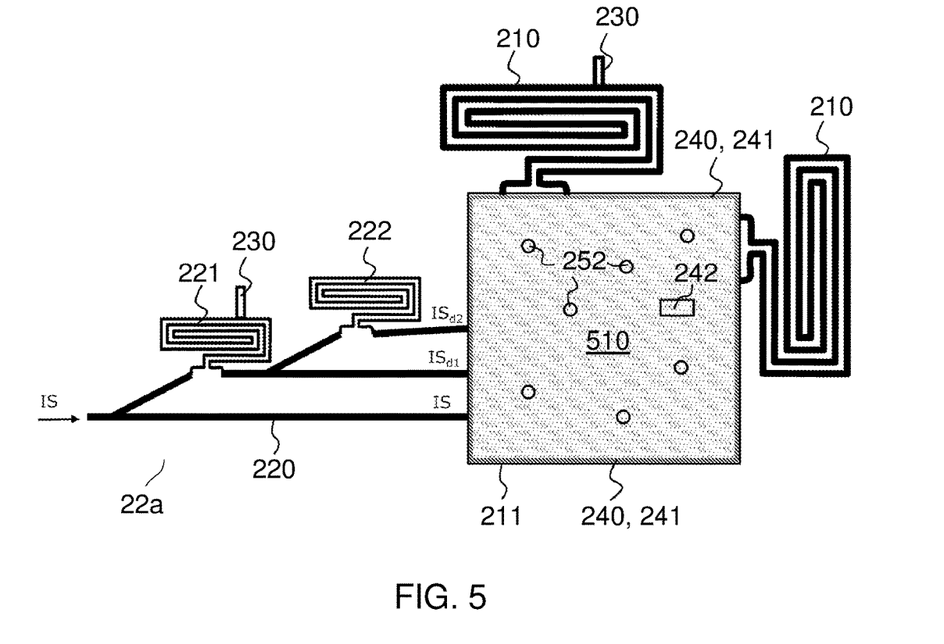
FIG. 5 schematically illustrates selected components of another photonic computing system, also configured as an optical reservoir, as involved in other embodiments.

The accompanying drawings show simplified representations of apparatuses and systems, or parts thereof, as involved in embodiments. Technical features depicted in FIG. 5 are not to scale. Similar or functionally similar elements in the figures have been allocated the same numeral references, unless otherwise indicated.

DETAILED DESCRIPTION OF EMBODIMENTS OF THE INVENTION

Neural cryptography relies on stochastic algorithms (e.g., ANN algorithms) for use in encryption and cryptanalysis. One may indeed contemplate using neural networks to handle encrypted data, since ANNs may, in principle, reproduce any function. I.e., a suitably trained ANN may possibly be used to find an inverse-function of a cryptographic algorithm. Although no practical applications have been proposed to date, one understands that encrypted data are at risk, owing to the rapid development of ANNs.

Based on this observation, the present Inventors came up with a conceptually simple solution to improve the security of encrypted, which may advantageously exploit a hardware-based encryption/decryption technology. This is explained in detail in the following description, which is structured as follows. First, general embodiments and high-level variants are described (sect. 1). The next section addresses more specific embodiments and technical implementation details (sect. 2).

1. General Embodiments and High-Level Variants

Figure 1:
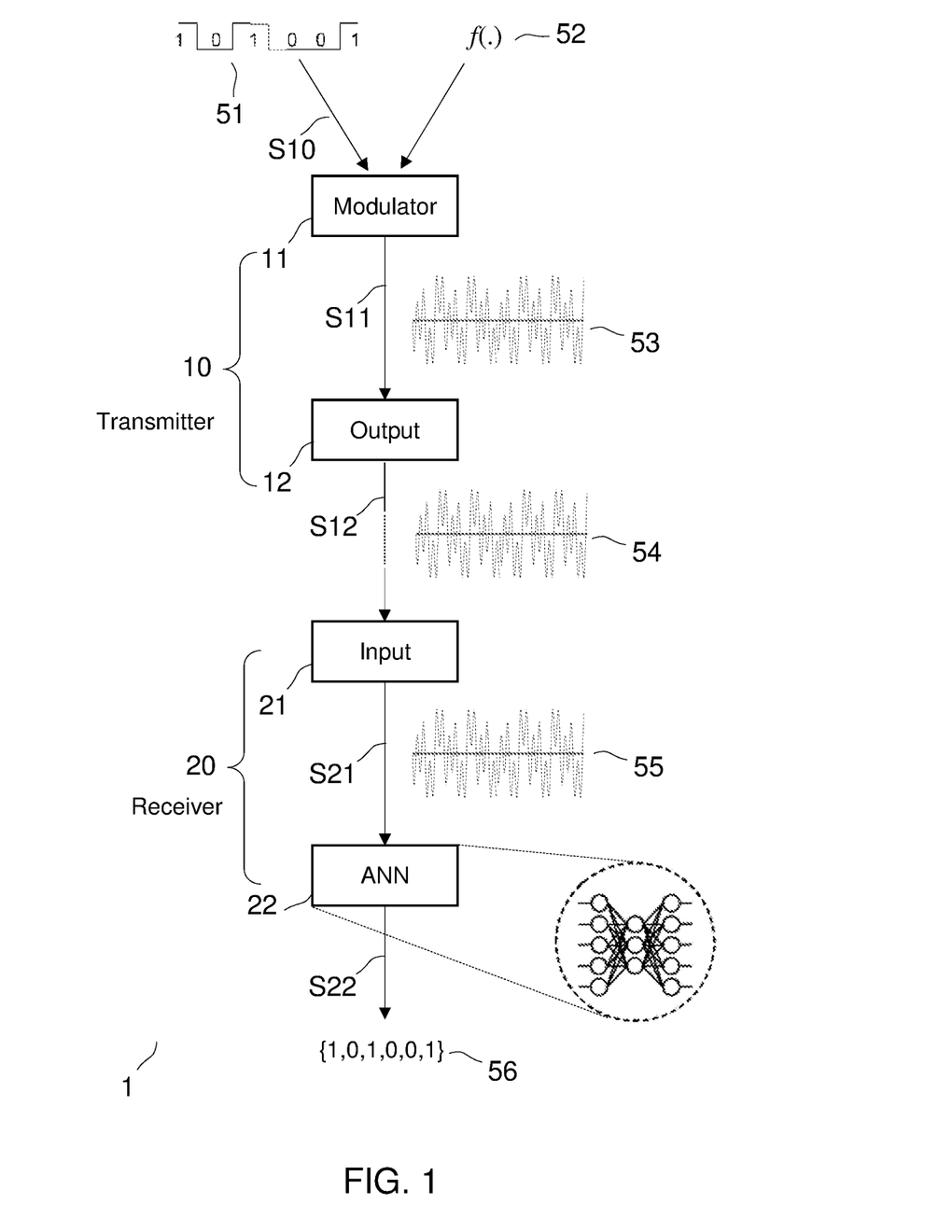
FIG. 1 is a diagram illustrating high-level steps of a method of modulating and demodulating signals, according to embodiments.
Figure 6:
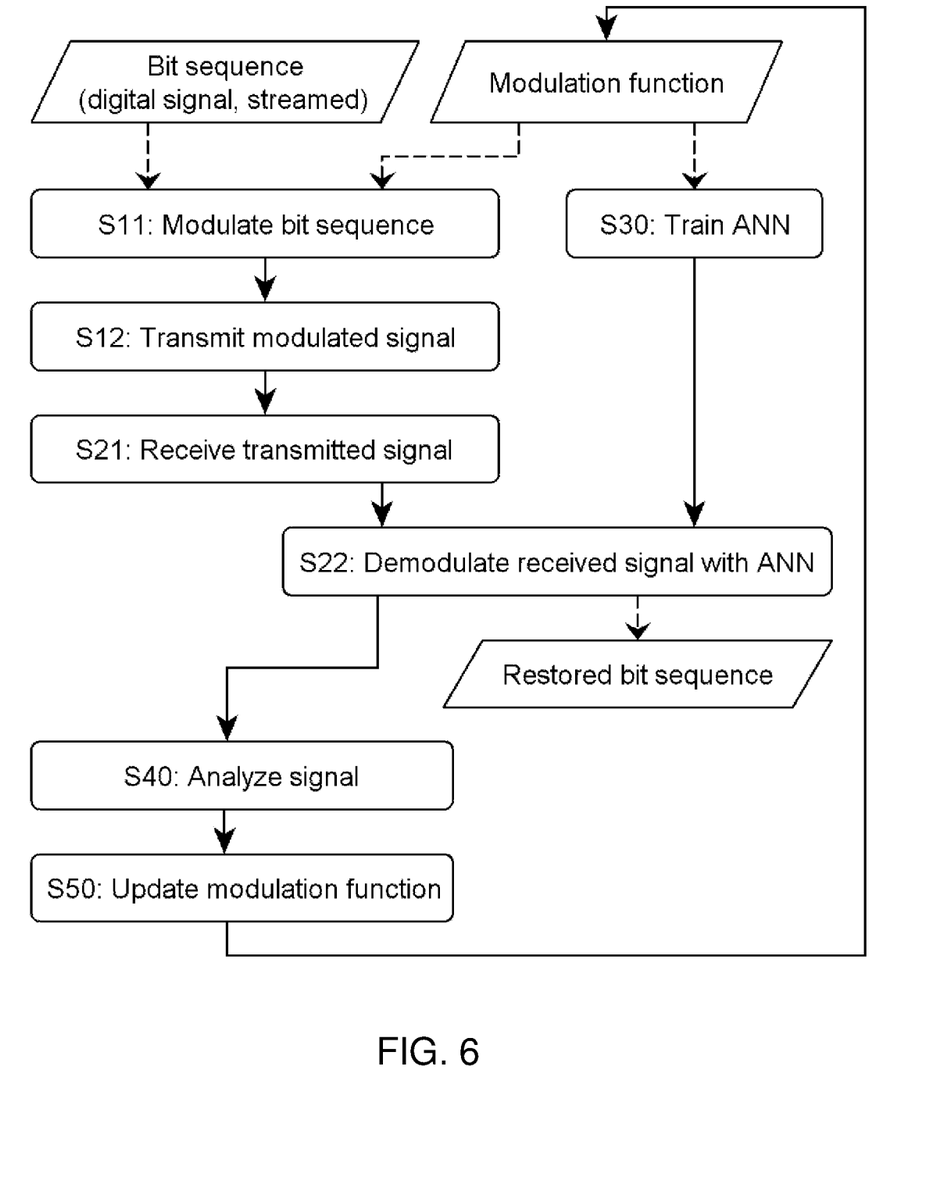
FIG. 6 is a flowchart illustrating high-level steps of a method of modulating and demodulating a signal, according to embodiments.

In reference to FIGS. 1 and 6, an aspect of the invention is first described, which concerns a method of demodulating a modulated signal, i.e., a method as implemented on the receiver side 20.

In some embodiments, this method relies on a modulated signal 54, which is received at step S12, wherein the modulated signal 54 is assumed to have been obtained by modulating (11, step S11) a given signal 51. More specifically, this signal 54 has been modulated thanks to a modulation function 52 that varies faster than the initial signal 51 (in the time domain). The modulation function 52 is a function of the signal 51: it takes the initial signal 51, values thereof, or values captured therein as arguments in order to produces a modulated signal 53. Such a signal 53 can then be transmitted S12 (as a signal 54) and coupled S21 as a signal 55 into an artificial neural network system 22 (hereafter ANN system) 22 for demodulation purposes.

That is, the modulated signal 55 is demodulated S22 using the ANN system 22, e.g., a trainable hardware device or computer system. More precisely, the system 22 is trained to identify bit values from signal patterns as caused by the modulation function 52, in operation. The demodulation S22 is carried out by identifying bit values from patterns of the modulated signal 54 received.

Comments are in order. In the present context, the modulation/demodulation operations performed amounts to encoding (or encrypting)/decoding (decrypting) data or signal values faster than the initial signal does. The demodulation may for instance be operated directly on the signal itself (amplitude, phase, etc.) or on discrete values it represents, as exemplified later.

The signal 51 as initially considered (prior to modulating S11 it) may for instance be a digital signal (e.g., as output by a digital circuit) or an analog signal (e.g., as output by a sensor or an analog circuit). A digital signal can for example be a pulse train (a pulse amplitude modulated signal) or a physical signal that is sampled and quantized. A digital signal may thus convey a discrete signal (or discrete-time signal), as a time series of values. In all cases, the time-varying quantity is, in a digital signal, a representation of a sequence of discrete values (a finite number of values). A digital signal is thus often referred to as a discrete signal. On the contrary, an analog signal is continuous in time, e.g., a sinus-shaped signal with a certain amplitude modulation or phase modulation, where the time-varying quantity is a representation of another time-varying quantity. Be it analog or digital, the initial signal 51 captures information to be transmitted. Such information may be captured as two or more bit values, for example.

This initial signal 51 is assumed to have been modulated S11 according to a modulation function $f(\cdot)$. This function may be a digital modulation function, producing discrete signals (as exemplified in FIGS. 3B, 3D) or continuous signals in output (as in FIGS. 3A, 3C). In all cases, the signal 53 resulting from the modulation step S11 may be a digital or an analog signal, and may be conveyed S12 (i.e., transmitted) electrically or optically, for example. Still, the intermediate transmission step S12 could use any wave transmission technology, such as acoustic waves, for example. The changes in the resulting carrier signal caused by the modulation S11 may for example form a finite (but typically large) number of alternative symbols making up a modulation alphabet, as in embodiments discussed below.

Consistently, the modulated signal 54 received at step S12 may be received in the form of a digital or an analog signal. It may for example be initially received S12 in the form of an analog signal, which may then possibly be converted S21 into a digital signal, e.g., sampled and interpreted as a set of successive discrete values, for subsequent demodulation purposes S22. In this case, the ANN system 22 demodulates S22 the converted signal by identifying S22 bit values from patterns of values in the converted signal. That is, the identification S22 operates based on discrete values rather than signal's characteristics. Yet, the demodulation step S22 need not necessarily be performed on discrete values and may instead be performed on the modulated signal itself, as noted above. I.e., the identification step S22 may be performed based on the signal's characteristics, for example based on an optical signal. For example, the modulated signal may well be transmitted optically and then optically coupled into the ANN system 22, the latter configured as an optical reservoir, as in embodiments discussed later.

Note, fiber optic data transmissions typically use square waves and the underlying signal is normally considered as a digital signal. However, in the present case, the signal conveyed depends on the initial signal 51 used and the modulation function 52, such that the fiber optic signal may not be a square wave anymore.

When using a software implementation of the ANN 22, the demodulation step S22 directly leads to a set of digits, e.g., $\{1, 0, 1, 0, 0, 1\}$, corresponding to digits captured by the initial signal 51. In variants relying on hardware implementations of the ANN 22 (i.e., where the ANN is a special-purpose hardware device, rather than a computer configured to implement an ANN), the demodulation step S21 shall typically lead to an intermediate signal (not shown), from which the final sequence is retrieved, as assumed in FIG. 1. When using a hardware optical network 22, for example, the signal obtained in output of the ANN 22 may typically be a stream of optical power (light of varying intensity), whose variations capture the same values as the initial signal 51. Thus, the signal obtained in output from step S22 may again be a discrete or analog signal, yet capturing values corresponding to those of the initial signal 51. Note, in embodiments, multi-level signals may be used in place of a binary signal, notwithstanding depictions used in FIG. 1.

The demodulation step S22 may be regarded as a classification of patterns formed by the signal 54 received S12 and then 55 coupled S21 into the ANN 22, wherein the classification is carried out by means of the ANN system 22. The ANN system 22 is assumed to be trained to identify bit values from patterns caused by the modulation function 52, i.e., patterns of values or corresponding signal patterns produced by this function 52, in operation. Thus, at inference time, the system 22 allows bit values to be identified S22 from patterns of the modulated signal 55, be it directly (as in software implementations of the ANN) or not (as in implementations using special-purpose ANN hardware).

If needed, the signal 54 received at step S12 may first be converted S21 into digital values for the system 22 to suitably classify patterns formed in such digital values, i.e., values which are anyway represented or captured by the signal 54. In one aspect, however, the ANN system directly operates S22 on the signal 54 as received. In such cases, the signal 55 coupled into the ANN 22 is "identical" to the signal 54 received at step 54 (subject to the coupling step S21, which might impact properties of the signal 54), such that no analog-to-digital conversion is needed in that case, making the demodulation S22 more efficient. Note, coupling the signal into a hardware ANN, for example, might impact the signal, e.g., cause optical losses and thus result in a smaller amplitude. Thus, the coupled signal will typically not be perfectly identical to the signal 54 in that case.

The present approach makes it possible to decode the signal received (e.g., directly on the stream received) at a rate that is higher than the bit rate of the bit sequence captured by the signal 51, thanks to the fact that outputs from the modulation function vary faster than the initial signal, as explained below. Because the resulting modulation speed used is unknown to an attacker, this makes it virtually impossible to reconstruct the bit-sequence without a properly trained system. Now, beyond the fact that the encoding rate and the initial bit rate are unknown to an attacker, the temporal resolution of the encoded signal 54 may fall under the resolution of the physical detection device used by the attacker, making it impossible to detect for that device. For example, using a hardware-implemented ANN makes it possible to operate at much higher frequencies than a typical physical detection device. E.g., such an ANN converts a "high-speed" encrypted signal into a "low-speed" decrypted signal That the modulation function varies faster than the initial signal basically means that the derivative of the modulated signal will, on average, change sign more often than the derivative of the initial signal (or a quantity captured by the latter) over a same time period. Such conclusions apply to continuous and differentiable signals and may hold for higher-order (n-th) derivatives, for signals of class $C^n$. For discrete/sampled signals, that the modulation function varies faster means that the successive differences of the modulated signal values of the modulated signal will, on average, change sign more often than the successive differences of the initial signal (or a quantity captured by the latter) over a same time period. Such differences are computed over intervals corresponding to the smallest temporal resolution available. Similar conclusions hold for the n-th differences (n>1). I.e., outputs from the modulation function oscillate faster in the time domain. This will typically result in that the modulated signal has a temporal frequency (i.e., a characteristic frequency or frequencies) that, on average, is higher than the temporal frequency (or characteristic frequencies) of the initial signal 51. I.e., the corresponding Fourier spectrum shifts to larger frequencies after modulation and the autocorrelation function falls off more rapidly from its maximum at lag 0, over the time interval corresponding to a minimal modulation time period of the modulation function.

For discrete signals, the modulation function can be said to have a smaller temporal resolution than the initial signal. For example, the signal shown in FIG. 2C shows eight pulses, where the signal of FIG. 2A has three over the same time interval. The higher temporal frequency of the modulated signal may be characterized by usual techniques in signal analysis and processing, e.g., via Fourier analysis, using power spectra of the signals, etc. Note, the above considerations pertain to the useful parts of the initial and modulated signals, once noise has been filtered out, if necessary. Yet, and notwithstanding possible noise, it remains the modulated signal will, for its essential (and useful) part, vary faster than the initial signal, for its essential (and useful) part.

As evoked above, the ANN system 22 is a cognitive system, which may possibly be implemented in software or, in hardware (as a special-purpose ANN hardware). The cognitive system may for instance be implemented as any suitable machine learning model, i.e., implemented in software run on a classical computer platform. It may notably be implemented as a spiking neural network or an auto-encoder, for example. Yet, such a computer platform may nevertheless integrate dedicated accelerators and other hardware optimizations for ANN. Similarly, co-optimized software and hardware platforms may be relied on. Still, the ANN system can be implemented in special-purpose ANN hardware, i.e., as a trainable hardware device such as a photonic computing system configured as an optical reservoir or a resistive processing unit, for the sake of speed upon demodulating and security for crypto-applications. In particular, it may advantageously be implemented as an optical reservoir hardware system, to enable high-speed decoding and crypto-applications compatible with high raw bit rates, based on optical signals, as discussed later in detail.

Note that, in the literature, the terms cognitive algorithm, cognitive model, machine learning model or the like are interchangeably used. In an effort to clarify terminologies, one may tentatively adopt the following definition: a machine learning model is generated by a cognitive algorithm, which learns its parameters from input data points, so as to arrive at a trained model. Thus, a distinction can be made between the cognitive algorithm being trained and the model that eventually results called trained model upon completion of the training of the underlying algorithm. Similarly, a distinction can be made between a trainable special-purpose ANN hardware and a trained hardware device. The special-purpose hardware device 22 as used in some embodiments for demodulation purposes S22 are assumed to have already been suitably trained with respect to the modulation function 52 as initially used to modulate S11 the signal 51.

All this is now described in detail, in respect of particular embodiments of the invention.

The method and variants described so far primarily revolve around the decoding/demodulation step S22 performed at the receiver 20. However, the present invention extends to methods implemented both at the transmitter side 10 and receiver side 20. Thus, in embodiments, the present methods also include modulating S11 the initial signal 51 according to the modulation function 52, in order to obtain a modulated signal 53. The modulated signal 53 obtained is then transmitted S12, for it to be received S12 and subsequently demodulated S22 by the ANN system 22.

The initial modulation S11 may for instance be achieved by digital signal processing (DSP), where digital modulation is sought. The modulated signal 53 obtained S11 can then be transmitted S12 electrically or optically, as evoked earlier. In variants, use can be made of an electro-optic modulator (EOM), in order to modulate S11 a beam of light, which can then be transmitted optically. E.g., a digital signal 51 may first be digitally processed and then optically encoded. To that aim, fast EOMs can be relied upon, such as lithium niobate or silicon-based EOMs, which devices are known per se. In other variants, the initial (digital or analog) signal 51 may be subjected to analog signal processing S11. Assume, for example, that the initial signal 51 is a digital signal, as in FIG. 1 (see also FIG. 2A). Since, for the present purposes, the modulation function 52 needs to vary faster than the input signal, the initial signal 51 may for instance be modulated S11 over each time period corresponding to each of the discrete values captured by the digital signal 51, respectively, to obtain the modulated signal 53. FIGS. 2B-2D show possible examples of resulting signals 53. For example, the modulation S11 may be based on instantaneous values of the discrete signal 51, where the initial bit sequence 51 is streamed through the modulator 11. As in amplitude modulation, an instantaneous value refers to the value as currently taken into account by the function 52 of the modulator 11, denoted by f(·) in FIG. 1. That is, the modulation function 52 may, based on a current value of the discrete signal and for each current value that is successively processes, produce a signal pulse (as in FIG. 2B) or a digital signal representing a set of several, distinct values (as in FIGS. 2C, 2D). As seen in FIGS. 2B-2D, the modulated signal varies "faster" than the input signal. I.e., in each case, the modulated signal shows several variations (oscillations) within the time interval corresponding to each discrete value of the initial signal of FIG. 2A. All such time intervals are normally constant, such that the resulting modulation pattern varies faster than the underlying bit sequence (the raw bit rate) and, this, for each time period corresponding to each discrete value of the initial signal 51. Note, while the time period over which the initial signal varies is 1 (a.u.) in FIG. 2A, the basic time period over which signals of FIGS. 2C and 2D are modulated is ¼ (a.u.).

Figure 2A:
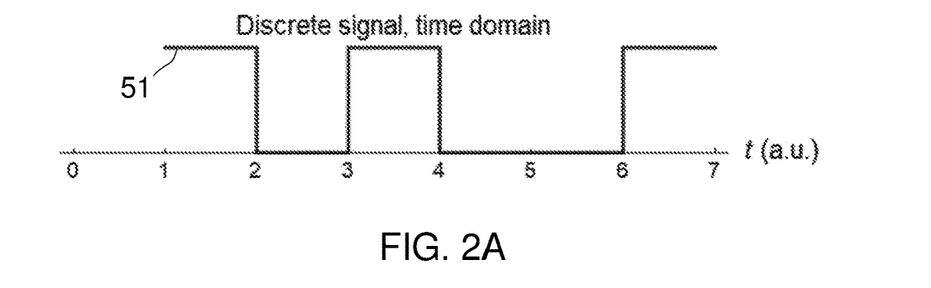
FIG. 2A shows an example of a discrete signal, representing a sequence of values {1, 0, 1, 0, 0, 1} as used in input for modulation.
Figure 2B:
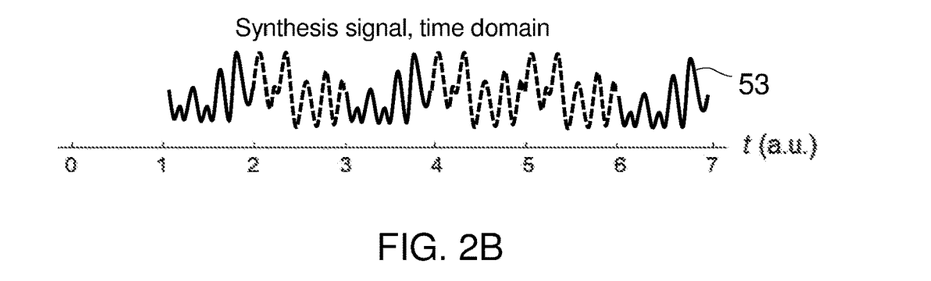
FIG. 2B illustrates an example of synthesis signal, as obtained after modulating the input signal of FIG. 2A with a modulation function, wherein the modulation function produces signal pulses as depicted in FIGS. 3A and 3C, based on a current (instantaneous) values (0 or 1) of the discrete input signal.
Figure 3A:
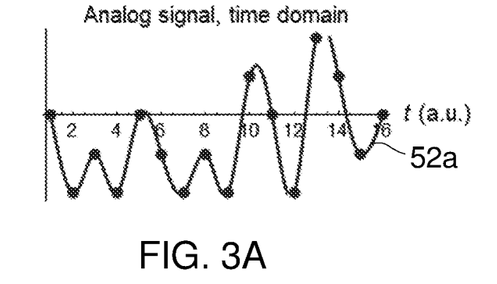
Figure 3B:
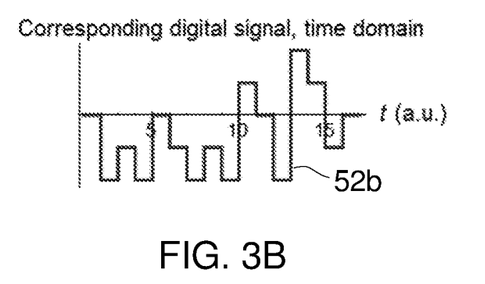
FIGS. 3B and 3D are discrete counterparts of the analog signal pulses of FIGS. 3A and 3C. Whereas the signal obtained in FIG. 2B is an analog signal.
Figure 3C:
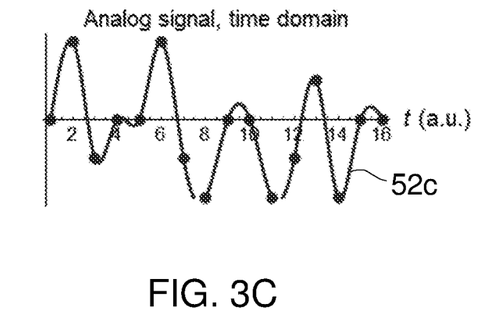

FIGS. 3A and 3C show two different pieces of continuous (analog) signals produced by a given modulation function for transforming a "1" and a "0". Applying this function to the initial sequence of FIG. 2A modulates this sequence and yields a signal as shown in FIG. 2B, which interleaves patterns according to FIGS. 3A and 3C. Because FIGS. 3A and 3C involve analog-like transformations, the signal obtained in FIG. 2B can be regarded as an analog signal.

Figure 2C:
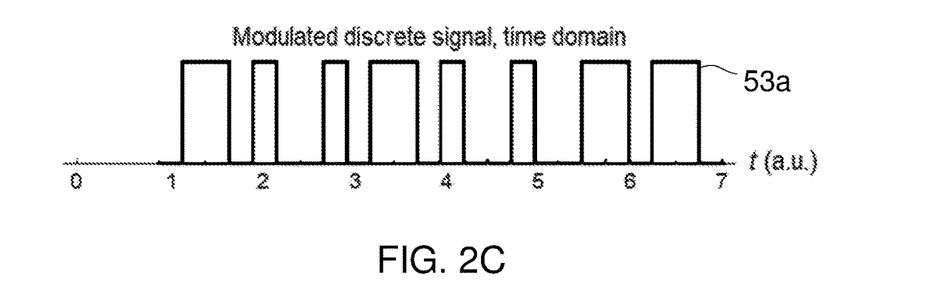
FIGS. 2C and 2D show examples of discrete modulated signals obtained by modulating the initial sequence of FIG. 2A based on more sophisticated substitution schemes, where the modulation function takes previous values of the signal as arguments, in addition to an instantaneous value.
Figure 2D:
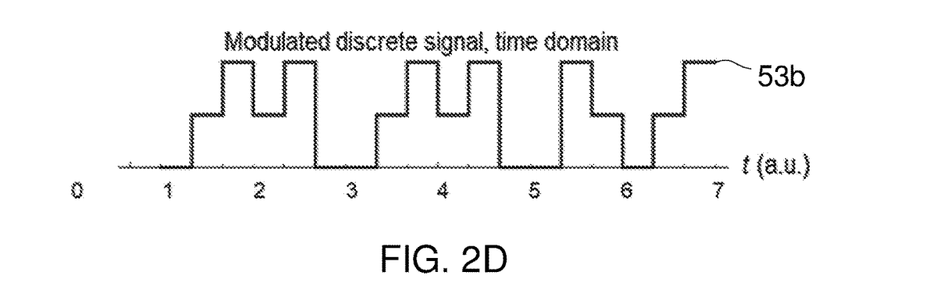
Figure 3D:
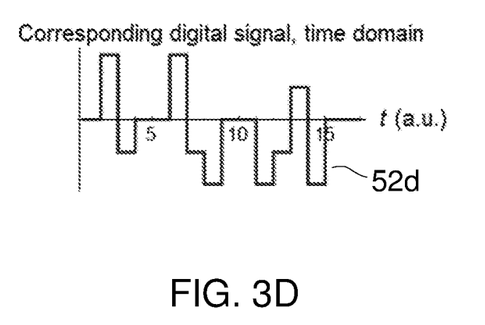

On the contrary, applying a discrete modulation function to the initial sequence of FIG. 2A would result in a discrete signal. For example, FIGS. 3B and 3D are discrete counterparts of the analog pieces of FIGS. 3A and 3C, which could be used to modulate the input signal of FIG. 2A. The outcome of such a modulation is not shown.

Yet, one understands that the initial signal 51 may possibly be a discrete signal, modulated by a discrete or analog modulation function, or an analog signal, which is, e.g., sampled for modulation purposes by a discrete modulation function. In variants, an analog modulation may be used to modulate the initial, analog signal, e.g., based on the instantaneous value of the analog input signal read (as in frequency modulation). What matters for the present purpose is that the modulation function varies faster than the initial signal (or the quantity represented by the latter).

Instead, FIGS. 2C and 2D depict modulated signals obtained by modulating the initial sequence of FIG. 2A according to more sophisticated substitution schemes, wherein previous values of the initial signal are taken into account, in addition to its instantaneous value. Namely, FIG. 2C is obtained by modulating the initial sequence FIG. 2A according to a substitution $\{k, l\} \rightarrow \{p, q, r, s\}$, while FIG. 2D is obtained by modulating the same initial sequence according to the substitution $\{k, l\} \rightarrow \{p, q, r\}$, yielding distinct time step subdivisions. While the modulation performed in FIG. 2C remains of binary form, the modulation in FIG. 2D yields a ternary code (a multi-level signal). Such substitution rules are described below detail.

First, we note that the modulation step S11 may advantageously operate on operands constituted by several discrete values of the initial signal 51. That is, each discrete value of the signal 51 may be modulated according to a modulation function 52 that takes two or more discrete values of the signal 51 in input. E.g., for each current value of the initial signal 51, the function $f$ may take the current value as well as one or more previous discrete values of the signal as input, to produce a modulation, as assumed in FIGS. 2C and 2D. I.e., the initial bit sequence $\{1, 0, 1, 0, 0, 1\}$ is modulated according to a parametric modulation.

In the example of FIG. 2C, the modulation function is assumed to perform substitutions as listed below: $\{k, l\}$ again denotes an input pair of values, where l is a current (instantaneous) value and k the value immediately preceding the current value l in the initial bit sequence, whereas the sets $\{p, q, r, s\}$ denotes modulated sets as produced in output:
$\{0, 0\} \rightarrow \{0, 0, 1, 1\}$
$\{0, 1\} \rightarrow \{0, 1, 1, 0\}$
$\{1, 0\} \rightarrow \{1, 0, 0, 1\}$
$\{1, 1\} \rightarrow \{1, 1, 1, 0\}$ That is, the basic time period is divided by two in this example (compare FIGS. 2C and 2A). Note, such substitutions will typically require to properly initialize the initial sequence, in order to enable a substitution for the very first or very last bit in the initial sequence. A dummy bit (e.g., 0) may for instance be prepended to the actual initial sequence. E.g., the initial sequence $\{1, 0, 1, 0, 0, 1\}$ shown in FIG. 2A may first be interpreted as the modified sequence $\{\{0\}, 1, 0, 1, 0, 0, 1\}$, where $\{0\}$ is prepended to $\{1, 0, 1, 0, 0, 1\}$. Then, the first actual value of the sequence $\{1, 0, 1, 0, 0, 1\}$ of FIG. 2A, which is 1, gives rise to an input pair value $\{0, 1\}$, consistently with the modified sequence. This, in turn, gives rise to the modulation $\{0, 1, 1, 0\}$, operated on a time step that is twice smaller than the initial's. The second actual value of the initial sequence of FIG. 2A is 0, which gives rise to the input pair $\{1, 0\}$, since the immediately preceding value is 1. This, in turn, leads to a modulated set $\{1, 0, 0, 1\}$, according to the above substitution list, and so on. Eventually, this leads to the modulated pattern depicted in FIG. 2C. The dummy bit prepended to the initial sequence need eventually be removed from the discrete signal 56, once reconstructed (after step S22). In variants, one may append a dummy bit, instead of prepending it to the initial sequence.

Note, where discrete signals are used, neither the initial signal 51 nor the modulated signal 53 need necessarily be binary signals (representing values of 0 or 1). For example, the modulation function 52 may use a ternary code to encode information, as assumed in FIG. 2D. Still, the arity of the modulated code can exceed that of the input code, to make it more difficult for an attacker to decode a sequence. Thus, while the initial signal 51 may encode a n-ary code (with $n \geq 2$), the modulated signal 53 can encode, after modulation S11, a m-ary code, with $m > n$. This is exemplified in FIG. 2D, where a ternary code is obtained after modulation S11, contrary to the binary encoding used in input (FIG. 2A).

More in detail, the following substitutions are assumed to be performed to obtain the signal of FIG. 2D, upon encoding S11. Again, a dummy bit (0) is assumed to have been prepended to the actual initial sequence. In the following list, $\{k, l\}$ denotes an input pair of values, where l is a current value of the input signal, while k is a previous value of the given bit sequence, and $\{p, q, r\}$ denotes modulated sets as produced in output of the modulation function 52:
$\{0, 0\} \rightarrow \{0, 2, 1\}$
$\{0, 1\} \rightarrow \{0, 1, 2\}$
$\{1, 0\} \rightarrow \{1, 2, 0\}$
$\{1, 1\} \rightarrow \{2, 1, 0\}$
Such substitutions give rise to the ternary sequence shown in FIG. 2D.

In variants to FIG. 2D (where the modulated signal encodes a m-ary code after modulation, with $m > n$.), the n-ary code may simply be converted into another n-ary code (i.e., $m = n$, based on a different temporal basis, as exemplified earlier in reference to FIG. 2C. In still other variants, the parity of the modulated signal may even be smaller than n (i.e., $m < n$), provided that the frequency of the signal is further modulated to compensate for the missing dimension. While the latter is easier to tap, it may nevertheless be more robust in transmission.

Note, the examples of modulations given in FIGS. 2B-2D are pedagogical examples: in practice, the modulations performed at step S22 shall typically operate on much longer initial sequences $\{k, l, \ldots\}$ and produce longer output sequences. In addition, the substitutions need not be static and could instead evolve over time. Moreover, more sophisticated, dynamic encoding may take place. Thus, the primary ANN system 22 may possibly need be re-trained S30 over time, as assumed in the flowchart of FIG. 6.

In simpler variants, however, each modulation step is based on a single value of the digital signal, i.e., based on the instantaneous value thereof, as assumed in FIG. 2A, where different bit values lead to distinct signal pulses (see FIGS. 3A, 3C) or discrete sequences (FIGS. 3B, 3D). Correspondingly, the modulation S22 may possibly result in a continuously varying signal (as in FIG. 2B) or a discrete signal (FIGS. 2C, 2D). In all cases, it remains that the added complexity of the higher frequency (or higher bit-rate) of the output signal (or sequence) makes it very difficult to interpret the signal 54, 55 without a suitably trained ANN and prior knowledge of the time step (bit rate) of the initial signal 51 and the modulation function 52.

In embodiments, the digital signal 51 is initially streamed S10 to a modulator 11, for it to modulate S11 the signal on the fly. Again, previous signal values may be used together with the instantaneous signal value to perform the modulation S11, as exemplified above. Consistently, the modulated signal 54 may be streamed to the ANN system 22 for it to demodulate S22 the streamed signal it receives on the fly.

In variants, the signal's values could possibly be re-arranged in blocks or arrays of block of sequences of bits, prior to modulating S11 the re-arranged signals. Such sequences can then be modulated S11 one after the other or in parallel, and then similarly demodulated, before re-assembling the sequence of values. In that respect, modulation patterns may be learned S30 across several, parallel sets of modulated sequences. Again, complex modulation schemes may be contemplated, to form complex symbols, notwithstanding the simple examples assumed in FIGS. 2-3.

An aspect is to modulate S11 two or more input signals in parallel (thanks to a modulation function 52 operating on all input signals considered), to obtain one or more modulated signals 53. Again, the resulting modulated signal(s) will vary faster than the input signals. The one or more modulated signals 54 as subsequently received at step S12 are then demodulated S22 with the ANN system 22 by pattern recognition, i.e., by identifying bit values from patterns of the one or more modulated signals 54 received at step S12. The initial signals 51 may for instance be input streams (i.e., sequences of data elements) in a software implementation of the ANN. In variants, it may be a set of analog signals. Thus, the modulation step S11 may result in a single stream or a single modulated, analog signal, or several streams or signals, which are fed S21 into the ANN for demodulation, so as to restore information comprised in the inputs signal(s).

The ANN may advantageously be a reservoir network. Now, for reasons of both efficiency and security, the ANN system 22 can be implemented as a trainable hardware device (i.e., a special-purpose ANN hardware), rather than in software. Also, and as evoked earlier, the modulated signal 54 may notably be optically transmitted S12, whereby the signal 54 received at step S12 is an optical signal 54. In that case, one may advantageously use a photonic computing system 20 to perform the demodulation S22. More precisely, the ANN system 22 may form part of a photonic computing system 20, configured as a reservoir computing system. Coupling S21 the optical signal 54 received into the ANN 22 causes the ANN 22 to demodulate S22 the coupled signal 55 by identifying bit values from signal patterns in the coupled signal 55.

As said, the signal 51 may for instance be modulated S11 with an EOM 11, prior to being optically transmitted S12, for the transmitted signal 54 to be received S12 and subsequently demodulated S22 by the photonic computing system 20. Still, while an EOM may advantageously be used to modulate the signal, other solutions can be contemplated to achieve the same. One such solution is to rely on a linear optical network with delay lines working with coherent light, see, e.g., https://arxiv.org/ftp/arxiv/papers/1501/1501.03024.pdf.

One may for instance rely on a linear optical network (with interconnected delay lines) to encode information in both the amplitude and the phase of the electromagnetic field carrying the signal. In variants, the modulation S11 may be based on the sole light intensity (only the amplitude of the field is modulated) or the sole phase. While the encoded signal 51 may be a digital signal, it may also be, in other variants, a mere analog signal (e.g., electrical), as mentioned earlier.

Figure 4:
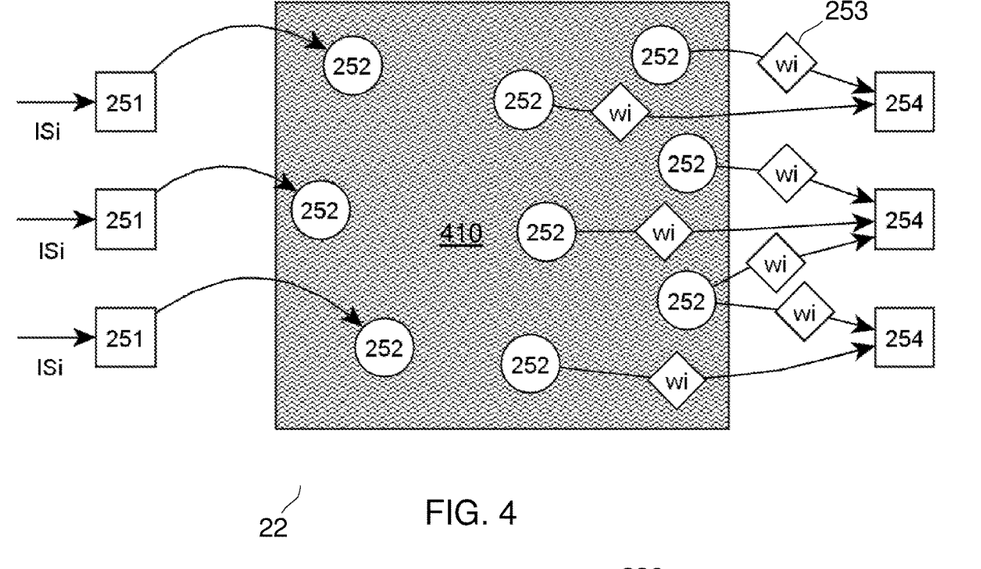
FIG. 4 schematically depicts an optical reservoir network, as well as selected components of a photonic computing system configured to implement such a network, as involved in embodiments.

Whether implemented as a trainable hardware device (i.e., a special-purpose ANN hardware) or in software, the basic working principle of the ANN, however, remains the same, as discussed now in respect of FIG. 4. First, temporal information captured by the modulated signal 54 need be mapped S21 onto one or more input nodes 251 of the input layer of the ANN. The input nodes 251 of the input layer are connected to one or more output nodes 254 of the output layer of the ANN via connections. At least some of these connections are associated to adjustable weight elements, i.e., they can be adjusted during a training process, making the system 22 a trainable system. The identification of bit values performed at step S22 requires to read signals from the output nodes.

Note, FIG. 4 assumes several input nodes and output nodes. In variants, however, each of the input and output layers may comprise a single node. In all cases, temporal information (and possibly additional information) contained in the signal 54 received at step S12 may first be adequately mapped S21 onto input nodes 251. The output nodes 254 may possibly be mapped onto distinct bit values or analog values. The actual bit values 56 are inferred thanks to the trained, weight elements 253, by suitably combining and weighting the values read in output.

Note, a similar architecture may be implemented in software, e.g., by way of a spiking neural network, or SNN, wherein, for example, output nodes are connected to each other via all-to-all lateral inhibitory connections, while input nodes are connected to output nodes via all-to-all excitatory connections, to which connection weights are associated. Other types of ANNs can be contemplated, such as FFNs, for example.

As discussed earlier, the modulated signal 54 received at step S12 may be an optical signal, in which case the ANN system 22 may advantageously be implemented as part of a photonic computing system 20, configured as a reservoir computing system. In that case, temporal information may be mapped S21 onto the reservoir computing system 22 by coupling the optical signal 54 onto input nodes 251 thereof. As further seen in FIG. 4, an input node 251 may be connected to one or more optical output nodes 254 via optical reservoir nodes 252 of a reservoir layer of the system 22. Each of the optical output nodes 254 will typically be connected by one or more of the optical reservoir nodes 252 via respective connections, to which adjustable weight elements 253 are respectively associated. Note, notwithstanding the depiction of the specific implementation of the reservoir shown in FIG. 4, the nodes 252 shall typically be connected in practice.

Reservoir computing systems allow an efficient analysis of dynamical input data by training the output. The ANN system may notably be implemented as a liquid-state machine or an echo state network. In embodiments, the reservoir layer may be achieved in the form of an optical interference pattern having a given optical power distribution, as assumed in FIG. 5. This way, temporal information of the optical input signal can be mapped into the optical interference pattern. Also, the output connections and associated weight elements may operate in the optical domain. The optical reservoir system shown in FIG. 5 is further described in sect. 2.1.

As illustrated in FIG. 6, the present methods may further comprise training S30 the ANN system, for it to identify bit values from signal patterns caused by the modulation function 52. This can notably be achieved by sending a training data set and then train S30 the ANN 22 based on the dataset received. The ANN 22 may notably be retrained S30, as necessary, e.g., upon changing the modulation conditions or changing the signal connection path. In security-sensitive applications, the training of the system 22 must be handled with care. The training datasets may for instance be transmitted using another channel than the channel used for inference purposes S22. Note, when using an optical network 22, changing the physical connection path might require re-training the system 22, in particular when the phase of the signal is modulated S11 and/or interpreted S22.

The modulation function 52 used at step S11 may need be adapted S50 for security reasons or in order to adapt to a dynamically evolving context: different types of data as used at a certain point in time may require a different type of modulation. Moreover, the modulation function 52 may possibly be updated S50 based on feedback received S40 from the ANN system 22, upon analyzing S40 properties of the demodulated signal S12, and so as to adapt a property of a subsequently modulated signal 51 (a signal modulated during a next cycle). This may notably be done so as to fulfill or optimize certain boundary conditions (e.g., maintain a constant average value of the modulated signal), or in view of improving the signal transmission (e.g., reducing the transmission errors by selecting an optimal function 52, in order to improve the physical contrast between different input states after decoding or the encoding efficiency). Note, the property(ies) analyzed at step S40 refer(s) to a signal 55 as received at the receiver. Thus, the analysis performed at step S40 impacts a next cycle S11-S22. For example, feedback received owing to step S40 may be used to ensure to maintain a constant average value of the modulated signal throughout subsequent cycles. Note that updates of the modulation function 52 might occur immediately after each cycle S11-S22, or after multiple cycles and multiple batches of training data.

For example, a second trainable ANN (not shown) may be used for the signal generation, upstream the modulator 11, so as to impact the modulation function 52. This second ANN can be used together with a control circuitry on the receiver side 20 to adjust the encoding function 52, so as to fulfill or optimize said boundary conditions, for example.

Next, according to other aspects, the invention can be embodied as a computing system, such as a demodulator 20 or a whole modulation system 1. Aspects of such systems have already been implicitly addressed in reference to the present methods and are only succinctly described in the following, in reference to FIGS. 1, 4 and 5.

First, the invention may be implemented as a sole demodulator 20 for demodulating a signal according to methods described earlier. Such a demodulator 20 can comprise an input unit 21 and an ANN system 22. The input unit 21 is configured to receive a modulated signal 54, i.e., a signal modulated according to a modulation function 52, so as to vary faster than the initial signal 51, as discussed earlier. The ANN system is connected to the input unit 21 for the latter to couple the received signal 54 into the ANN system 22, in operation. As explained earlier, the ANN system 22 is assumed to be trained to identify bit values from signal patterns caused by the modulation function 52. The system 22 is otherwise configured, in the demodulator 20, so as to demodulate modulated signals 55 coupled into it by identifying bit values from patterns of the modulated signal 54 received.

Referring to FIGS. 4 and 5, the ANN system 22 may notably be a reservoir computing system, e.g., form part of a photonic computing system 20 configured as a reservoir computing system. Such a reservoir computing system is adapted to demodulate an optical signal 53, 54 by identifying bit values from patterns of the modulated optical signal 53 received by the input unit 21 and then coupled into the ANN system 22, in operation.

As seen in FIG. 4, the ANN system may notably comprise an input layer of one or more input nodes 251, as well as an output layer of one or more output nodes 254. The input nodes 251 are connected to the output nodes via connections (arrows), where at least some of these connections are associated to adjustable weight elements 253. The ANN system 22 may identify bit values by reading signals from said output nodes 254, in operation. More generally though, the ANN system 22 may be implemented as a trainable, special-purpose hardware device in the demodulator 20.

The input unit 21 may further be configured so as to map temporal information (and/or specific information, other dimensional information, such as wavelength, polarization, core in a multi-core fiber) captured in the modulated signal 54 onto input nodes of the system 22. In variants, the input unit 21 may simply couple (e.g., optically) the signal 54 onto a single input node.

In the system 22 depicted in FIG. 4, the input nodes 251 are connected to optical output nodes 254 via optical reservoir nodes 252 of a reservoir layer of the system 22. Each optical output node 254 is connected by one or more of the optical reservoir nodes 252 via respective connections, to which adjustable weight elements 253 are respectively associated. The input unit 21 is configured to receive a modulated signal 54 as an optical input signal 54 and couple the latter ISi into the input nodes 251, as described in detail in sect. 2.1.

Another example of a photonic computing system 22a is shown in FIG. 5, which is described in detail in sect. 2.1.

Note, in implementations relying on optical reservoir networks, the receiver 20 may further comprise an optical detector, which, however, would be positioned downstream the ANN 22. In other words: the signal 54 is first fed S21 into the optical ANN 22, and then detected with the optical detector, the input unit 21 being basically a coupler in that case, meant to couple the received signal into the ANN.

In variants where a non-optical system such as a RPU is used, instead of an optical reservoir, the input unit 21 should similarly be configured (e.g., programmed) to map temporal information (and possibly other information, such as amplitude, phase, etc.) captured in the input signal onto various input nodes of the ANN, for them to relay the signals into upper layers of the network.

Referring back to FIG. 1, according to another aspect, the invention can be embodied as a modulation/demodulation system 1 for both modulating and demodulating a signal. That is, such a system 1 comprises both a demodulator 20 (such as described earlier) and a modulator 11. The latter is configured to modulate a signal 51 according to a modulation function 52 to obtain a modulated signal. As explained earlier, the modulation function 52 is a function of the signal 51 (i.e., it takes the signal 51 as an input) and its outputs vary faster than the signal 51. Moreover, the system 1 includes a transmission unit operatively connected to the modulator 11, so as to transmit modulated signals obtained by the latter.

Again, the modulator 11 may possibly be configured to modulate a digital signal 51, e.g., over each time period corresponding to each of the discrete values captured by the digital signal 51, respectively, to obtain the modulated signal 53. In addition, the modulator 11 may further be configured to modulate the digital signal 51 based on two or more discrete values thereof (e.g., the instantaneous value, as well as one or more previous values), thanks to a suitable modulation function 52. The modulator 11 may for instance be adapted to modulate a streamed signal on the fly. Similarly, the ANN system 22 may possibly be designed to demodulate on the fly, in particular when using a special-purpose optical system.

The above embodiments have been succinctly described in reference to the accompanying drawings and may accommodate a number of variants. Several combinations of the above features may be contemplated. Examples are given in the next section.

2. Specific Embodiments—Technical Implementation Details

2.1 Optical Reservoir Computing Systems

FIG. 4 schematically depicts a photonic computing system 22 embodied as optical reservoir computing system, according to embodiments. The photonic computing system 22 comprises an input layer, a reservoir layer and an output layer. The input layer comprises a plurality of input nodes 251, configured so as to receive optical input signals ISi (e.g., optical input streams) and forward such signals ISi to the reservoir layer. The reservoir layer comprises a confined reservoir region, e.g., a continuous optical reservoir region 410 with a plurality of optical reservoir nodes 252. The reservoir layer is here formed as an optical interference pattern having an optical power distribution, as described later in reference to FIG. 5.

The photonic computing system 22 comprises further a plurality of optical output connections between the reservoir nodes 252 and the output nodes 254. At least some of the optical output connections are associated to weighting elements (wi) 253, which can be adjusted during the training process S30. I.e., the optical reservoir system 22 can be trained to perform specific computation tasks as discussed in sect. 1.

In an optical reservoir system such as depicted in FIG. 4, the input nodes 251 may be embodied as optical input waveguides, e.g., as coupling areas arranged at an intersection with the optical interference region (forming the reservoir layer), while the reservoir nodes 252 may be embodied as readout units.

The training process of the optical reservoir computing system 22 will change the weights wi 253. However, the reservoir layer itself will remain fixed (other connections remain associated to fixed weights, which do not change during the training/learning process).

In operation, the output nodes 254 deliver an optical output signal, which can be converted into the electrical domain by suitable converters, as known per se. The converted output signals may then be further processed in the electrical domain by suitable hardware or software processing means. In general, the adjustment of the weights 253 may be done in software or hardware. E.g., a hardware control circuit with additional control software running on it may receive the output signals of the output nodes 254 during the training process and may adjust the weights of the optical weighting elements 253 by applying electrical control signals to the optical weighting elements 253. The optical weighting elements 253 may be, e.g., embodied as optical attenuators or optical amplifiers. During the training process, certain states of the reservoir system may be assessed. In particular, using some learning algorithms, the state of the output connections 254 after the weighting elements 254 might be invoked. Therefore, parts of the optical signal might be split to a dedicated detector and fed to the respective learning algorithm during the training process.

An optical reservoir computing system 22 such as depicted in FIG. 4 may advantageously be operated according to the reservoir computing paradigm.

In embodiments, the optical-to-electrical conversion is carried out at the optical output nodes 254. In variants, though, this conversion may be carried out upstream the nodes 254, e.g., at the reservoir nodes 252. There, the output connections, the weighting elements 253, and the output nodes 254 may be embodied as electrical components. Note, however, that the optical reservoir itself and the reservoir nodes 252 solely remain in the optical domain. In variants, the weighting elements 253 and the output nodes 254 may be embodied in software.

In all cases, the output weights 253 can be trained, so as to form a trained (or controlled) layer formed by output nodes 254 and subsequently infer results, during an inference stage.

FIG. 5 shows a schematic illustration of another photonic computing system according to embodiments.

The computing system 22a comprises two feedback delay waveguides, which are used to map temporal information contained in the optical input signal 54 into the optical interference pattern 510. The optical interference pattern has an optical power distribution representing the optical power at respective locations of the optical interference pattern.

The computing system 22a comprises a plurality of readout units 252, embodying reservoir nodes, as discussed in respect of FIG. 4. The readout units 252 are arranged in an inner area of the optical interference region 510 as opposed to edges 241 (grey shading in FIG. 5) of the optical interference region 510. This inner area may for instance be defined as the entire area of the optical interference region 510 but the outer edges 241. The edges 241 could possibly be formed by a mirror structure, e.g. a Bragg reflector, or a metal coating on the interference region 510. In variants, the edges 241 may correspond to a transition between the interference region 510 and a surrounding area (not shown), e.g., formed by a layer (e.g., $SiO_2$) having a different refractive index than the interference region 510 (e.g., Si).

The readout units 252 are configured to detect optical readout signals RSi of the optical power distribution at readout positions RPi of the inner area of the optical interference region 510. The readout unit 252 may for example be configured to detect optical intensities, optical powers, optical energies and/or information as to the optical phases.

The photonic computing system 22a comprises two input delay waveguides 221 and 222. The input delay waveguide 221 is meant to receive part of an input signal IS, e.g., through a splitter or a coupler. The input signal IS is then delayed by the input delay waveguide 221 and forwarded to the interference region 510 as a delayed input signal $IS_{d1}$ with a first time delay d1. The delayed input signal $IS_{d1}$ is furthermore forwarded to the input delay waveguide 222, e.g., via a splitter or coupler. The delayed input signal $IS_{d1}$ is then further delayed by the input delay waveguide 222 and forwarded to the interference region 510 as a further delayed input signal $IS_{d2}$ with a second time delay d2. Further combinations of feedback delay lines and input delay lines may be contemplated, to achieve a desired temporal mapping.

In addition, the system 22a may comprises nonlinear components implemented as, e.g., thermo-optical elements, electro-optical elements, electrical feedback loops and/or optical cavities to map the temporal information of the optical input signal into the optical interference pattern. Such nonlinear components provide a nonlinear dependence of the optical interference pattern on the optical input signals.

For example, the optical computing system 22a may possibly comprise one or more nonlinear components 230, 242 for performing a nonlinear signal transformation. The nonlinear components 242 may for instance be arranged in the interference region 510 (as assumed in FIG. 5). Such nonlinear components 242 may for instance be provided as, e.g., a photorefractive element, an optical amplifier or an attenuator.

In variants, nonlinear components may be arranged in an upstream input waveguide (not shown), the input delay waveguides 221, 222 and/or the feedback delay waveguides. For example, optical cavities 230 may be arranged in the feedback delay waveguides 210 or the input delay waveguides 221, 222, as schematically shown in FIG. 5. Such cavities may possibly be configured to have a finite optical lifetime.

In other variants, the interference region 510 in the optical computing system 22*a* may possibly comprise one or more scattering elements (e.g., similar to elements 242) for scattering the optical wave and increasing the complexity of the optical interreference pattern.

In other variants, the receiver 20 may comprise nonlinear elements that do not form part of the optical system 22*a* itself.

2.2 Software Implementations of ANNs

As noted in Sect. 1 and 2.1, the ANNs may wholly or partly be implemented in software. Thus, the present invention may be embodied as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method of demodulating a modulated signal, the method comprising:
    receiving a modulated signal, wherein the modulated signal is a signal modulated according to a modulation function varying faster than the signal, the modulation function being a function of the signal; and
    demodulating the modulated signal received with an artificial neural network (ANN) system, the ANN system trained to identify bit values from signal patterns as caused by the modulation function, by identifying bit values from patterns of the modulated signal received,
    wherein said signal encodes, prior to modulating it, a n-ary code, with n larger than or equal to two, and the modulated signal encodes, after modulating it, a m-ary code, with m strictly larger than n.

2. The method according to claim 1, wherein the method further comprises, prior to receiving the modulated signal:
    modulating the signal according to said modulation function to obtain said modulated signal; and
    transmitting the modulated signal obtained, for it to be received and subsequently demodulated by the ANN system.

3. The method according to claim 2, wherein,
    the signal is a digital signal; and
    at modulating, the signal is modulated over each time period corresponding to each of the discrete values captured by the digital signal, respectively, to obtain the modulated signal.

4. The method according to claim 3, wherein modulating the digital signal comprises:
    for each of said discrete values, modulating said digital signal according to said modulation function based on two or more discrete values of the digital signal, the discrete values including said each of the discrete values, as well as one or more previous discrete values of the digital signal.

5. The method according to claim 3, wherein
    modulating the digital signal comprises streaming the digital signal to a modulator, for it to modulate the signal streamed on the fly, and
    transmitting comprises streaming the modulated signal to the ANN system for it to demodulate the streamed signal it receives on the fly.

6. The method according to claim 2, wherein
    at transmitting, the modulated signal is optically transmitted.

7. The method according to claim 6, wherein
    the modulated signal received is an optical signal and the ANN system forms part of a photonic computing system, configured as a reservoir computing system, and
    the method further comprises coupling the modulated signal received into the ANN system for the ANN system to demodulate the coupled signal by identifying bit values from patterns of the coupled signal.

8. The method according to claim 7, wherein
    the signal is modulated with an electro-optic modulator, prior to being optically transmitted, for the transmitted signal to be received and subsequently demodulated by the photonic computing system.

9. The method according to claim 8, wherein
    modulating the signal comprises modulating an amplitude and/or a phase of an electromagnetic field carrying the signal.

10. The method according to claim 2, wherein
    modulating comprises modulating two or more input signals according to the modulation function, so as to obtain one or more modulated signals, each varying faster than the input signals, the modulation function being a function of the input signals, such that one or more modulated signals are subsequently received; and
    the one or more modulated signals received are demodulated with the ANN system, by identifying bit values from patterns of the one or more modulated signals received.

11. The method according to claim 2, wherein the method further comprises
    after demodulating the modulated signal, adapting the modulation function based on feedback obtained from the demodulated signal, so as to adapt a property of a next modulated signal, and
    modulating a subsequent signal based on the adapted modulation function.

12. The method according to claim 1, wherein
    the method further comprises converting the modulated signal received into a discrete signal, for the ANN system to demodulate the converted signal by identifying bit values from patterns of values in the converted signal.

13. The method according to claim 1, wherein
    the ANN system is implemented as a trainable hardware device,
    the method further comprises, prior to demodulating the modulated signal received, mapping temporal information captured by the modulated signal received onto one or more input nodes of an input layer of the ANN system, wherein the ANN system further comprises an output layer of one or more output nodes, wherein the input nodes of the input layer are connected to output nodes of the output layer via connections, wherein at least some of these connections are associated to adjustable weight elements, and identifying said bit values comprises reading signals from said output nodes.

14. The method according to claim 13, wherein said modulated signal is received as an optical input signal, and the ANN system is implemented as part of a photonic computing system configured as a reservoir computing system, whereby mapping said temporal information comprises coupling said optical input signal onto an input node of the reservoir computing system, wherein the input node is connected to one or more optical output nodes of the output layer via optical reservoir nodes of a reservoir layer of the reservoir computing system, each of said optical output nodes is connected by one or more of the optical reservoir nodes via respective connections, and adjustable weight elements are respectively associated to said respective connections.

15. The method according to claim 1, wherein the method further comprises training the ANN system, for it to identify bit values from signal patterns as caused by the modulation function.

16. A demodulator for demodulating a signal, the demodulator comprising:

an input unit configured to receive a modulated signal that is a signal modulated according to a modulation function varying faster than the signal, the modulation function being a function of the signal; and an artificial neural network (ANN) system, connected to the input unit for the input unit to couple the received signal into the ANN system, in operation, wherein the ANN system is trained to identify bit values from signal patterns as caused by the modulation function and configured to demodulate the modulated signal coupled into it by identifying bit values from patterns of the modulated signal received, wherein the ANN system is implemented as a trainable hardware device in the demodulator, whereby the ANN system comprises an input layer of one or more input nodes and an output layer of one or more output nodes, wherein the input nodes are connected to the output nodes via connections and at least some of these connections are associated to adjustable weight elements, and wherein the ANN system is configured to identify bit values by reading signals from said output nodes.

17. The demodulator according to claim 16, wherein the ANN system is a photonic computing system configured as a reservoir computing system, the latter adapted to demodulate a modulated optical signal by identifying bit values from patterns of the modulated optical signal received by the input unit and coupled into the ANN system, in operation.

18. The demodulator according to claim 16, wherein the ANN system is implemented as a photonic computing system configured as a reservoir computing system, which comprises a single input node connected to one or more optical output nodes of the output layer via optical reservoir nodes of a reservoir layer thereof, each of said optical output nodes is connected by one or more of the optical reservoir nodes via respective connections, adjustable weight elements are respectively associated to said respective connections, and the input unit is configured to receive said modulated signal as an optical input signal and couple the latter into the single input node.

19. A modulation system for modulating and demodulating a signal, the system comprising:

a modulator configured to modulate a signal according to a modulation function to obtain a modulated signal, wherein the modulation function is a function of the signal, which vary faster than the signal, a transmission unit operatively connected to the modulator to transmit modulated signal obtained by the latter, a demodulator that comprises:

an input unit configured to receive a modulated signal transmitted by the transmission unit, in operation; and an artificial neural network (ANN) system, connected to the input unit for the input unit to couple the received signal into the ANN system, in operation, wherein the ANN system is trained to identify bit values from signal patterns as caused by the modulation function and thereby configured to demodulate the modulated signal coupled into it by identifying bit values from patterns of the modulated signal it receives, in operation, wherein the signal is a digital signal and the modulator is configured to modulate the digital signal over each time period corresponding to each of the discrete values captured by the digital signal, respectively, to obtain the modulated signal.

20. The modulation system according to claim 19, wherein the modulator is further configured to modulate, for each of said discrete values, said digital signal according to said modulation function, based on two or more discrete values of the digital signal, the discrete values including said each of said discrete values, as well as one or more previous discrete values of the digital signal.

21. The modulation system according to claim 19, wherein the modulator is adapted to modulate a streamed signal on the fly, and the ANN system is configured to demodulate a modulated signal it receives on the fly.

22. The modulation system according to claim 19, wherein each of the modulator and the ANN system is a photonic computing system.

* * * * *